US007071254B1

(12) United States Patent
Klein et al.

(10) Patent No.: US 7,071,254 B1
(45) Date of Patent: Jul. 4, 2006

(54) PREPARATION CONTAINING GYPSUM FROM FLUE GAS DESULPHURISATION, METHOD FOR USING THE SAME AND USE THEREOF

(75) Inventors: Johann Klein, Duesseldorf (DE); Gaby Schilling, Duesseldorf (DE); Sabine Sipmann, Monheim (DE); Ralph Schuetze, Hilden (DE); Friedheim Koepnick, Duesseldorf (DE); Helmut Loth, Essen (DE); Klaus Helpenstein, Moenchengladbach (DE); Wolfgang Klauck, Meerbusch (DE); Claudia Mai, Duesseldorf (DE)

(73) Assignee: Henkel Komanditgesellschaft Auf Aktien (Hendel KGAA), Duesseldorf (DE)

( * ) Notice: Subject to any disclaimer, the term of this patent is extended or adjusted under 35 U.S.C. 154(b) by 0 days.

(21) Appl. No.: 09/856,236

(22) PCT Filed: Nov. 10, 1999

(86) PCT No.: PCT/EP99/08645

§ 371 (c)(1),
(2), (4) Date: Aug. 21, 2001

(87) PCT Pub. No.: WO00/29473

PCT Pub. Date: May 25, 2000

(30) Foreign Application Priority Data

Nov. 17, 1998 (DE) ................................ 198 53 006

(51) Int. Cl.
*C08K 3/30* (2006.01)
*C08K 3/18* (2006.01)
*C08K 3/36* (2006.01)

(52) U.S. Cl. ...................... 524/423; 524/426; 524/444; 524/445; 524/446; 524/447; 524/425; 524/420; 524/483; 524/492; 524/493; 524/494

(58) Field of Classification Search ................ 524/423, 524/426, 483, 444, 445, 446, 447, 450, 425, 524/492, 493, 494
See application file for complete search history.

(56) References Cited

U.S. PATENT DOCUMENTS 5,169,617 A * 12/1992 Clemens et al. ............. 423/555
5,298,542 A * 3/1994 Nakamura et al. .......... 524/297
5,852,063 A 12/1998 Meinhardt .................... 521/83
6,171,388 B1 * 1/2001 Jobbins ....................... 106/778
6,299,970 B1 * 10/2001 Richards et al. .......... 428/294.7

FOREIGN PATENT DOCUMENTS

| DE | 41 34 550 | 5/1995 |
| DE | 195 43 886 | 5/1997 |
| JP | 76/139114 | 1/1976 |

OTHER PUBLICATIONS

Wirsching et al., *Fuellstoffe aus REA-Gips*, ZGK International, No. 5, (vol. 48), pp. 241-256, (Bauverlag GmbH), 1995.
Mark et al., *Encyclopedia of Polymer Science and Technology*, 2nd. Edition, vol. 17, pp. 406-409, John Wiley, New York, 1989.
*Roempp Chemie-Lexikon*, 10th Edition, vol. 2, pp. 1010-1011, Thieme-Verlag, 1990.
*Ullmann's Encyclopedia of Industrial Chemistry*, 5th Edition, vol. A21, "Plastics, Properties and Testing to Polyvinyl Compounds", pp. v-vii, VCH, Weinheim, Germany, 1987.
*Ullmann's Encyclopedia of Industrial Chemistry*, 5th Edition, vol. A22, "Poly(Vinyl Esters) to Reduction", pp. 1-15, VCH, New York, 1993.
*Hanbook of Additives*, 3rd Edition, pp. 381-399, Chapman and Hall, 1990.
Lesko et al., *Emulsion Polymerization and Emulsion Polymers*, Chapter 18, "Acrylic and Styrene-Acrylic Polymers", pp. 619-655, John Wiley, New York, 1997.
Blackley, D., *Emulsion Polymerization and Emulsion Polymers*, Chapter 15, "Diene-based Synthetic Rubbers", pp. 521-561, John Wiley, New York, 1997.

* cited by examiner

*Primary Examiner*—Tae H. Yoon
(74) *Attorney, Agent, or Firm*—Woodcock Washburn LLP (57) ABSTRACT

The present invention relates to a composition, and a method of preparing and using the same. The composition contains at least one water-soluble or water-dispersible polymer or combinations thereof, and one or more filler particles that includes WDP gypsum particles. The WDP gypsum particles are obtained from waste gas-desulphurization plants and have a particles size distribution mean diameter ranging from 13 μm to 500 μm. The composition is particularly useful as a surface coating, a surfacing compound, a sealing compound, an adhesive or a molding composition.

29 Claims, 2 Drawing Sheets

PREPARATION CONTAINING GYPSUM FROM FLUE GAS DESULPHURISATION, METHOD FOR USING THE SAME AND USE THEREOF

CROSS REFERENCE TO RELATED APPLICATIONS

This application is a national stage application under 35 U.S.C. § 371 of international application PCT/EP99/08645 filed on Nov. 10, 1999, the international application not being published in English. This application also claims priority under 35 U.S.C. § 119 to DE 198 53 006.4, filed on Nov. 17, 1998.

FIELD OF THE INVENTION

This invention relates to a preparation containing a water-soluble polymer or a water-dispersible polymer or a mixture of two or more thereof and gypsum particles from waste-gas desulfurization plants (WDP gypsum) with a value for the particle size distribution ×50 of 13 to 500 μm, to a process for its production and to its use.

BACKGROUND OF THE INVENTION

Inorganic inert fillers and polymeric materials are often used in admixture with one another. Depending on the ratio by weight of filler to polymeric material, properties can be attributed to the end product obtainable from such a mixture that would be very difficult or even impossible to achieve using a material which consisted of only one of the components of the mixture (i.e. only polymer or only filler). The combination of inorganic inert filler and polymers is often aimed at and used not least because both materials have very different property profiles of which the combination is not only desirable but actually necessary for many applications.

Fillers which generally consist of a number of individual loose filler particles are often chemically inert to the environment around them. Because of this, filler particles can often only be formed/shaped together with a binder. Suitable binders are, for example, organic and inorganic binders. One exception to this are fillers which are capable of setting to form solid materials by reacting with a reactant present in the surrounding environment. Examples of such fillers are gypsum in the form of anhydrite and various lime compounds which are capable of curing by reacting with water or carbon dioxide from the surrounding air.

Whereas the self-setting fillers mentioned above generally cure to form brittle hard materials, a distinctly broader spectrum of physical and chemical properties can often be achieved by replacing the inorganic materials with polymers. However, disadvantages of using polymers only generally include increased production costs by comparison with inorganic materials and their lower hardness and chemical resistance, particularly in regard to fire resistance and flameproofing.

In this connection, the building supplies industry in particular has a steadily increasing demand for new materials which combine the positive properties of fillers, such as their chemical resistance, their resistance to heat, their availability in large quantities and their low price, with those of the polymers. The demand ranges from surface coating compositions or adhesives, which are generally applied as a thin layer to surfaces of various kinds, through surfacing and sealing compounds to plastics of the type used, for example, as a sheathing for power cables or as water conduits.

For example, Wirsching, Hüller, Hufmann and Pürzer describe the use of fillers of WDP gypsum in ZKG INTERNATIONAL, No. 5, 1995 (Vol. 48), pp. 241–256 (Bauverlag GmbH). The article in question describes in particular the use of WDP gypsum from coal-fired power stations in adhesives, paints and plastics. Before being used as a filler, the gypsum is finely ground so that it has a mean particle diameter of about 8 to 12 μm and the upper cut of the particle diameter is at about 25 to 50 μm.

JP 76-139114 relates to the use of WDP gypsum as a pigment in coating compositions. This document describes a composition of titanium dioxide, WDP gypsum, aluminium silicate, ethylene/vinyl acetate copolymer, polyvinyl acetate, thickener and water as a white emulsion which is suitable as a coating composition.

Filler-containing polymer materials are often marketed and processed in the form of aqueous dispersions. Unfortunately, such materials frequently have serious disadvantages during and after processing. Firstly, the viscosity of the dispersions often cannot be adjusted to a value suitable for processing. Secondly, after processing and generally after drying, the filler-containing polymer material applied undergoes a distinct change in volume in relation to its volume at the time of application. This change in volume can often correspond to the extent to be expected as a result of evaporation of the water present in the dispersion.

Behavior such as this (often referred to as "shrinkage" or "contraction") is undesirable, above all for filler-containing polymer dispersions which are supposed to perform a "filling" function. Thus, in the case of surface coatings for example, importance is often attributed to the levelling of any structural unevenness of the substrate. Surfacing or sealing compounds, for example, are expected to fill the void to be sealed or filled—even after drying of the compound introduced—to the full extent to which the dispersion was originally introduced.

In addition, the contraction of surfacing compounds frequently leads during drying of the compound to the formation of cracks therein which, besides the generally noticeable visual disadvantages, often represent starting points for the penetration of corrosive compounds or moisture. The visual impression and the stability of the region thus filled are often drastically impaired as a result.

Filler-containing polymer materials are often used as adhesives, more particularly emulsion-based adhesives. Unfortunately, many adhesives of this type lack elasticity which is often a disadvantage to the stability of the adhesive bond under stress.

SUMMARY OF THE INVENTION

Now, the problem addressed by the invention was to remedy these disadvantages. This problem has been solved by a polymer composition which, besides a water-soluble or water-dispersible polymer or a mixture of two or more such polymers, contains filler particles in the form of gypsum particles from waste-gas desulfurization plants of which the particle size distribution has a mean diameter (×50) of about 13 to about 500 μm.

DETAILED DESCRIPTION OF THE INVENTION

Accordingly, the present invention relates to a preparation containing a water-soluble polymer or a water-dispersible polymer or a mixture of two or more thereof and filler particles, the filler particles being gypsum particles from waste-gas desulfurization plants (WDP gypsum) with a value for the particle size distribution x50 of 13 to 500 µm (as measured with a Sympatec Helos H0720 in isopropanol).

In the context of the invention, a "preparation" is any mixture which contains the constituents mentioned above. It may be a mixture which is already in a form suited to the application envisaged (for example already provided with a suitable quantity of water) or which first has to be brought by the user into a form suitable for application, for example a powder dispersible in water.

A "water-soluble polymer or water-dispersible polymer" in the context of the present invention is a polymer which, in the form of a mixture with water, forms a molecularly disperse solution, a substantially stable gel or colloid or a substantially stable dispersion. In the context of the present invention, it does not matter whether the stability of the aqueous preparations mentioned derives from the properties of the polymer itself or is supported by such additives as emulsifiers, stabilizers, gel formers or the like.

The preparation according to the invention may contain, for example, only a certain water-soluble polymer or a certain water-dispersible polymer. However, the preparation may equally well contain a mixture of two or more water-soluble polymers or a mixture of two or more water-dispersible polymers. According to the invention, the preparation may also be a mixture of one or more water-soluble polymers and one or more water-dispersible polymers.

The water solubility or self-dispersibility of polymers can be based, for example, on the presence of anionic or cationic groups such as are normally present in polymers to achieve such an effect. Solubility or dispersibility in water can also be obtained by arranging nonionic groups on a polymer suitable for use in accordance with the invention, these nonionic groups leading to water solubility or water dispersibility of the polymer.

Suitable cationic groups are, for example, quaternized amino groups; suitable anionic groups are, in particular, acid groups.

For example, water-soluble polymers obtainable by polymerization of monomer constituents which impart water solubility to the polymers may be used for the purposes of the present invention. Such polymers include, for example, the polymers of acrylic acid and the polymers obtainable by polyaddition of alkylene oxides. Polymers which are "self-dispersible" in water are also suitable. "Self-dispersible polymers" are understood to be polymers which form a substantially stable dispersion in water without the addition of emulsifiers. In general, polymers such as these contain, for example, carboxylic acid groups, sulfonic acid groups, phosphonic acid groups or chain segments of polyethylene oxide or a mixture of two or more of the functional groups mentioned as functional groups.

Polymers which are neither soluble in water nor "self-dispersible" may be converted into a substantially stable emulsion or dispersion in water, for example using commercially available emulsifiers or dispersants.

Suitable polymers are, for example, polyurethanes, polyacrylates, polymethacrylates, polyvinyl esters, polystyrene and sulfonated polystyrene, polybutadiene and sulfonated polybutadiene, polyamides, polyesters and polyvinyl chloride. Other suitable polymers are corresponding co- and ter-polymers, such as ethylene/vinyl acetate copolymers (EVA), styrene/butadiene copolymers (SBR), styrene/acrylonitrile polymers (SAN), styrene/acrylate copolymers and the like. Another preferred embodiment is characterized by the use of, for example, polymers obtainable from the polymerization of acrylates or from the co- and ter-polymerization of acrylates with acrylonitrile, vinyl esters, maleates, acrylic acid, styrene and the like. Polymers such as these and polymers dispersions resulting from them are comprehensively described, for example, in "Encyclopaedia of Polymer Science and Technology" (Editors: Mark, Bikales, Overberger, Menges, 2nd Edition, 1989, Wiley, New York, 17, pp. 406–409).

In another preferred embodiment, water-soluble or water-dispersible polymers or mixtures thereof already present in dissolved or dispersed form are used for the production of the preparation according to the invention. These polymers are in particular aqueous dispersions of synthetic polymers of the type mentioned above, more particularly polyurethanes, poly(meth)acrylates, polyvinyl esters, polystyrene, polybutadiene, polyamides or polyvinyl chloride, or mixtures of two or more thereof. The corresponding co- and ter-polymers, styrene/butadiene, styrene/acrylates may also be used for the purposes of the present invention, as may natural latices. The dispersions usable in accordance with the invention may be prepared, for example, by suspension or emulsion polymerization of the corresponding monomers. Secondary dispersions—obtainable by dispersing a polymer melt in a suitable medium—may also be used.

Polymer dispersions which are generally obtainable commercially in large quantities as the outcome of suspension or emulsion polymerizations and which are used, for example, as binders for emulsion paints or emulsion-based adhesives (see, for example, Römpp Chemie-Lexikon, Vol. 2, Thieme-Verlag, 1990, pp. 1010–1011 and the literature cited therein) are preferably used. Unsaturated, radical-polymerizable compounds, such as acrylates and methacrylates, dienes or olefins, or mixtures of two or more thereof are particularly suitable as monomers for such polymer dispersions. The suspension or emulsion polymerization is described, for example, in "Ullmann's Enzyklopädie der technischen Chemie" (Vol. A21, 5th Edition, VCH, 1987), reference being expressly made to this literature reference.

Polymer dispersions used in a preferred embodiment of the present invention are based on polyvinyl esters, such as polyvinyl acetate, and co- and ter-polymers of the vinyl esters with monomers, such as ethylene, acrylates or methacrylates or maleic acid mono- and diesters, or mixtures of two or more thereof. Monomers which lead to dispersions suitable for use in accordance with the present invention are described, for example, in Ullmann's Enzyklopädie der technischen Chemie (Vol. A22, 1993, VCH, pp. 1–15). Dispersions prepared on the basis of such monomers are described, for example, in "Handbook of Additives" (3rd Edition, Chapman and Hall, pp. 381–399). Reference is hereby expressly made to the cited literature references.

Polymers suitable in a preferred embodiment are, for example, the copolymers of vinyl acetate, vinyl propionate or VeoVa® 9 or 10 with other comonomers. VeoVa® 9 and 10 are the vinyl esters of tert. carboxylic acids (Versatic® Acid 9 or 10) for copolymerization with, for example, vinyl acetate for emulsion paints, plasters, concrete additives, paper and textile coatings, emulsion-based adhesives and paints (manufacturer: Deutsche Shell Chemie). Particularly suitable polymers are co- and ter-polymers containing vinyl acetate/dibutyl maleate, vinyl acetate/n-butyl acrylate, vinyl acetate/2-ethylhexyl acrylate, vinyl acetate/n-butyl acrylate/ N-hydroxymethyl acrylamide, vinyl acetate/crotonic acid, vinyl acetateVeoVa® 10, vinyl acetate/VeoVa® 10/acrylic acid, vinyl acetate/VeoVa® 10/n-butyl acrylate, vinyl acetate/N-hydroxymethyl acrylamide, vinyl acetate/vinyl laurate, vinyl acetate/vinyl laurate/vinyl chloride, vinyl acetate/ethylene/vinyl chloride, vinyl acetate/ethylene/acrylate, vinyl acetate/ethylene/acrylamide, vinyl acetate/ethylene/N-hydroxymethyl acrylamide, vinyl propionate, vinyl propionate/vinyl chloride, vinyl propionate/tert.butyl acrylate, VeoVa® 10/vinyl chloride, VeoVa® 10/styrene/acrylate, VeoVa® 10/styrene/maleate, VeoVa® 10/styrene/acrylate/maleate and VeoVa® 10/VeoVa® 9/methyl methacrylate/butyl acrylate, VeoVa® 10 being completely or partly replaceable by VeoVa® 9.

Another preferred embodiment of the invention is characterized by the use of polymer dispersions based on poly (meth)acrylates and co- and ter-polymers of the (meth) acrylates with such monomers as acrylonitrile, vinyl esters, maleates, acrylic acid and styrene. Corresponding polymer dispersions are comprehensively described, for example, in "Emulsion Polymerisation and Emulsion Polymers" (1997), John Wiley, pp. 619–655, New York) and are regarded as part of the present disclosure.

Another preferred embodiment of the invention is characterized by the use of commercially obtainable dispersions, such as DL 345 (manufacturer: Dow Latex) or Acronal® DS 3518 (manufacturer: BASF AG).

Aqueous polymer dispersions based on conjugated dienes, such as chloroprene or butadiene, and copolymers of these dienes with unsaturated compounds, such as styrene or acrylonitrile, may also be used in accordance with the present invention. Such dispersions are known and are described, for example, in "Emulsion Polymerisation and Emulsion Polymers" (1997), John Wiley, pp. 521–561, New York). Reference is hereby specifically made to the cited literature reference.

Besides the polymers mentioned, monomers with additional functional groups, such as N-methylol acrylamide, hydroxypropyl acrylate, (meth)acrylic acid or a mixture of two or more of the compounds mentioned, may be used for preparing the polymer dispersions usable in accordance with the invention.

The preparations according to the invention contain at least WDP gypsum particles with a value for the particle size distribution ×50 of 13 to 500 μm (as measured with a Sympatec Helos H0720) as filler.

WDP gypsum particles differing in their dimensions are formed in different waste-gas desulfurization plants in dependence upon the technical parameters. It has been found in accordance with the present invention that the advantages according to the invention can be obtained with WDP gypsum particles having the above-mentioned values for the particle size distribution.

In general, various processes may be used to measure a particle size distribution and the corresponding value ×50. Typical processes include, for example, the sieve process where a certain quantity of particles is sieved through sieves with different mesh widths. The total quantity of particles is thus divided into fractions with different particle diameters of which the quantity is expressed as a percentage of the total weight of the particles investigated. Other methods for determining particle size distribution are, for example, light scattering and Fraunhofer diffraction. In the context of the present invention, the particle size distribution of the WDP gypsum particles was determined by the Fraunhofer diffraction technique using a Sympatec Helos H0720. The particle size distribution was measured on a suspension in isopropanol. The following particle size distribution data are based on measurements by the technique mentioned but are not confined to such measurements. The advantages according to the invention can generally be obtained with any WDP gypsum particles whose particle size distribution in largely within the range mentioned, irrespective of the measuring system.

In a preferred embodiment of the present invention, the WDP gypsum particles have a lower limit to the particle size ×50 of at least about 25 μm. In another preferred embodiment, the value for the particle size distribution ×50 is about 30 to 250 μm. Good results can be obtained, for example, where the values for the particle size distribution ×50 are in the range from about 35 to about 200 or of the order of 150 μm. Another preferred embodiment of the invention is characterized by the use of WDP gypsum particles with a ×50 value for the particle size distribution of from about 40 to about 120 μm, for example in the range from about 60 to about 110 μm and more particularly in the range from about 80 to about 100 μm.

It has also been found to be of advantage for the filler particles to have a granular or rodlet-like form.

The WDP gypsum particles used as filler particles in accordance with the invention show their advantages according to the invention even when they are used as sole filler. In this case, WDP gypsum particles with a ×50 value for the particle size distribution in the range from about 13 to about 110 μm and more especially in the range from about 35 to about 80 μm are used in a preferred embodiment of the invention.

In another preferred embodiment of the present invention, the WDP gypsum particles are used in admixture with at least one other type of inorganic filler particles.

In the context of the invention, the expression "one other type" of inorganic filler particles is intended to encompass any filler particles which differ from WDP gypsum particles either in their chemical composition, in their predominant spatial form (for example their crystal form) or in a combination of two or more of the features mentioned. In a preferred embodiment of the present invention, filler particles which differ at least in the ×50 value of their particle size distribution from the corresponding value of the particle size distribution of the WDP gypsum particles are used as the other type of inorganic filler particles.

Suitable other types of inorganic filler particles are, for example, any inorganic filler particles inert to the other substances present in the preparation according to the invention. So far as the other type of inorganic filler particles is concerned, there are no restrictions on the ×50 value for the particle size distribution. For example, filler particles with a ×50 value for the particle size distribution in the range from about 0.01 to about 500 μm may be used in accordance with the present invention.

Suitable other types of inorganic filler particles are, for example, filler particles of andalusite, sillimanite, kyanite, pyrophillite, imigolite or allophane. Also suitable are compounds based on sodium aluminates or calcium silicates and minerals, such as silica, calcium sulfate (gypsum) which does not come from waste-gas desulfurization plants in the form of anhydrite, semihydrate or dihydrate, silica flour, silica gel, barium sulfate, titanium dioxide, zeolites, leucite, potash feldspar, biotite, the group of soro-, cyclo-, ino-, phyllo- and tectosilicates, the group of poorly soluble sulfates, such as gypsum, anhydrite or heavy spar, and calcium minerals, such as calcite or chalk ($CaCO_3$). According to the invention, the inorganic materials mentioned may be used individually as another type of inorganic filler particles. However, a mixture of two or more of the compounds mentioned may equally well be used. A preferred embodiment of the invention is characterized by the use of calcite, kaolin, dolomite, silica flour and gypsum ($CaSO_4 \cdot 2\ H_2O$).

In another preferred embodiment of the present invention, the filler particles of the other type have a ×50 value for the mean particle size distribution in the range from about 1 to about 120 μm, for example in the range from about 3 to about 60 μm or in the range from about 60 to about 90 μm.

Organic filler particles which cannot readily be assigned to the water-soluble or water-dispersible polymers are also suitable for use as another type of filler particles. These include in particular the finely ground plastic powders obtained in the recycling of plastics, more particularly the plastic powders obtainable from the fine grinding of highly crosslinked elastomeric or thermoset polymers. One example of such powders is the rubber powder obtained, for example, in the fine grinding of car tires.

Where the preparation according to the invention contains some filler particles of the other type either individually or in the form of a mixture of two or more thereof, the ratio by weight of WDP gypsum particles to filler particles of the other type is about 1:1,000 to about 1,000:1. Good results can be obtained, for example, if the ratio by weight of WDP gypsum particles to filler particles of the other type is about 1:10 to about 10:1 and more particularly about 5:1 to about 1:5.

In another preferred embodiment of the present invention, the filler component of the preparation contains at least about 0.5% by weight and, more particularly, at least about 1% by weight of WDP gypsum particles. In another preferred embodiment of the present invention, the percentage content of WDP gypsum particles is at least about 10% by weight or at least about 20% by weight. Good results are also obtained with percentage contents of WDP gypsum particles of at least about 30, 40 or 50% by weight or more, for example about 60 to 80% by weight or at least about 90% by weight.

In a preferred embodiment, the preparation according to the invention contains at least about 20% by weight of filler particles (WDP gypsum particles or other filler particles or a mixture thereof. A larger percentage of filler particles, for example about 30, 40 or 50 to 99% by weight, for example about 60 to 90% by weight, may also be added.

The compositions according to the invention may be present as a ready-to-use aqueous dispersion, i.e. they may contain the water-soluble or water-dispersible polymer or the mixture of two or more such polymers and the fillers together with water. According to the invention, however, the compositions may equally well contain no water or only a little water, i.e. for example may be present as a dry powder or as a paste of low water content. According to the invention, the preparation according to the invention may also be present as a water-free paste, a non-aqueous liquid, for example a solvent or another constituent of the preparation according to the invention, being used to establish the paste-like properties. Corresponding powders or pastes are of advantage, for example, when the actual preparation of an aqueous dispersion intended for use is to be left to the user himself/herself. In a preferred embodiment of the present invention, the preparation according to the invention is present in the form of a powder (redispersion powder).

If WDP gypsum particles are to be used as filler in accordance with the present invention, it is important to test the stability of the polymer dispersion used to calcium ions. In such a case, stability may have to be restored or improved by adding another emulsifier or dispersant or a mixture of two or more emulsifiers or dispersants.

Besides the polymer(s) and the filler particles, the preparation according to the invention may contain other ingredients. If the preparation according to the invention is intended to be ready-to-use, it may contain water. Depending on the application envisaged for the preparation according to the invention, the water content may vary between about 0 and 49% by weight.

Basically, water contents (based on the preparation as a whole) of about 0 to 49% by weight are suitable.

In addition to the constituents mentioned, the composition according to the invention may also contain one or more other additives.

Suitable other additives are, for example, emulsifiers, dispersants, stabilizers, defoamers, antioxidants, photostabilizers, pigment dispersants and the like.

The present invention also relates to a process for the production of a preparation containing a water-soluble polymer or a water-dispersible polymer or a mixture thereof and WDP gypsum particles with a particle size ×50 of 13 to 500 μm (as measured with a Sympatec Helos H0720 in isopropanol) or a mixture of WDP gypsum particles and at least one other type of inorganic filler particles, characterized in that at least one water-soluble polymer or at least one water-dispersible polymer or a mixture of two or more thereof or an aqueous dispersion containing one or more such polymers is mixed with WDP gypsum particles having a particle size ×50 of 13 to 500 μm (as measured with a Sympatec Helos H0720 in isopropanol) or a mixture of WDP gypsum particles and at least one other type of inorganic filler particles and optionally with water and one or more other additives in one or more mixing steps in any order and with any time intervals between individual mixing steps.

Figure 1:
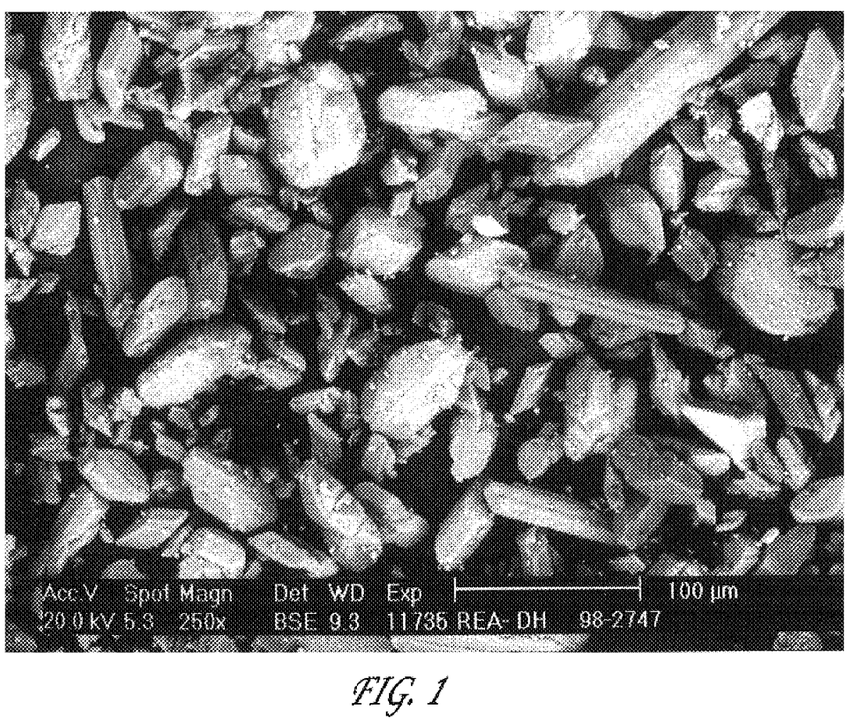
FIG. 1 is an electron micrograph showing WDP gypsum particles useful in the present invention.

The invention is illustrated by the accompanying drawings wherein:

FIG. 1 is an electron micrograph of WDP gypsum with a granular to rodlet-like particle form.

Figure 2:
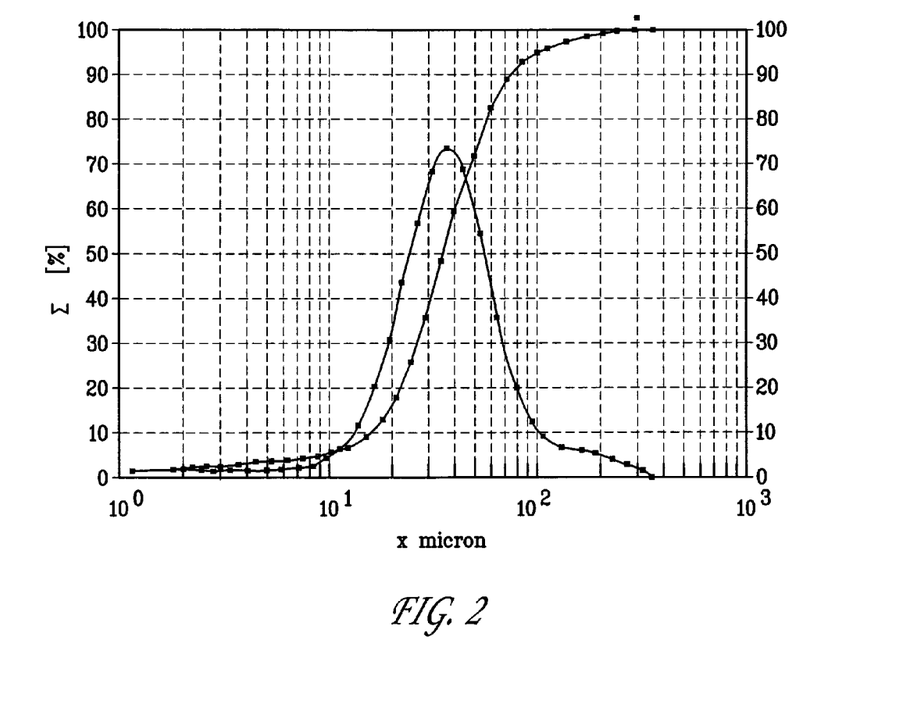
FIG. 2 is a graph showing the particle size distribution of WDP gypsum particles useful in the present invention.

FIG. 2 shows the size distribution of the filler particles of a WDP gypsum used by way of example as filler.

The present invention also relates to the use of WDP gypsum particles having a ×50 value of the particle size distribution of 13 to 500 μm (as measured with a Sympatec Helos H0720 in isopropanol) for the production of surface coatings, surfacing compounds, sealing compounds, adhesives or moldings with a content of water-soluble or water-dispersible polymers.

In a preferred embodiment of the invention, the WDP gypsum particles have a ×50 value for the particle size distribution of 30 to 250 μm.

The present invention also relates to the use of a mixture of inorganic filler particles containing WDP gypsum particles with a ×50 value for the particle size distribution of 30 to 250 μm and at least one other type of inorganic filler particles as a filler in polymer dispersions.

The invention is illustrated by the following Examples.

EXAMPLES

Example 1

Elasticity of Emulsion-Based Adhesives

Compositions according to the invention show favorable elongation behavior when used as an emulsion-based adhesive.

| Formulation: | |
|---|---|
| acrylate dispersion (for example Acronal ® DS 3518, BASF) | 55 g |
| pigment dispersant (for example Pigmentverteiler A, BASF) | 2 g |

Fillers:

A: fine calcite filler (for example Omyacarb 5GU, D50 value 6 μm; Omya)

B: unground WDP gypsum (for example from Rethmann, D50 value 40 μm)

C: ground natural gypsum (for example Alabaster Brilliantweiß, D50 value 11 μm; Börgardts)

D: coarse calcite filler (for example 50:50 mixture of Omyacarb 130 AL/Omyacarb 40 GU, D50 value (mixture) 88 μm; Omya)

Same-weight Filler Exchange

| Filler mixture | | | | | Max. force [kN/mm$^2$] | Elongation at max. force [%] | Elongation at break [%] |
|---|---|---|---|---|---|---|---|
| A [%] | A [g] | B [g] | C [g] | D [g] | | | |
| 0 | 0 | 84 | — | — | 0.01 | 260 | 2840 |
| 50 | 42 | 42 | — | — | 0.02 | 680 | 1060 |
| 100 | 84 | 0 | — | — | 0.03 | 190 | 830 |
| 0.02 | 0 | — | 84 | — | 0.02 | 90 | 1050 |
| 0.03 | 42 | — | 42 | — | 0.03 | 140 | 900 |
| 100 | 84 | — | 0 | — | 0.03 | 190 | 830 |
| 0 | 0 | — | — | 125 | 0.01 | 420 | 2330 |
| 20 | 25 | — | — | 100 | 0.02 | 390 | 1500 |
| 50 | 62.5 | — | — | 62.5 | 0.02 | 340 | 1250 |
| 80 | 100 | — | — | 25 | 0.03 | 280 | 780 |
| 100 | 125 | — | — | 0 | 0.03 | 130 | 630 |

Example 2

Volume Shrinkage of Surfacing Compounds as a Function of the Filler Composition

Visual Evaluation

| Formulation: | |
|---|---|
| Styrene/acrylate dispersion (for example DL 345 from Dow Latex) | 110 g |
| Pigment dispersant (for example Pigmentverteiler A, BASF) | 4 g |

Filler:

Filler used in 50 or 100% same-volume or same-weight exchange for filler A (visual evaluation:—)

A: fine calcite filler (for example Omyacarb 5GU, D50 value 6 μm; Omya)

B: unground WDP gypsum (for example from Rethmann, D50 value 40 μm)

C: ground natural gypsum (for example Alabaster Brilliantweiß, D50 value 11 μm; Börgardts)

D: coarse calcite filler (for example 50:50 mixture of Omyacarb 130 AL/Omyacarb 40 GU, D50 value (mixture) 88 μm; Omya)

E: unground WDP gypsum (for example No. 1 from ProMineral, D50 value 36 μm)

F: unground WDP gypsum (for example No. 2 from ProMineral, D50 value 96 μm)

G: medium-coarse calcite filler (for example Omyacarb 40 GU, D50 value 44 μm; Omya)

+: no visible volume shrinkage, no cracks

±: slight volume shrinkage/crack formation

−: distinct volume shrinkage/crack formation

| | Same-weight Filler Exchange | | Same-volume Filler Exchange | |
|---|---|---|---|---|
| | 50% | 100% | | |
| Filler = | by weight X | by weight X | 50% by vol. X | 100% by vol. X |
| B | ± | + | − | ± |
| C | ± | ± | − | − |
| D | − | − | − | − |
| E | − | + | − | + |
| F | + | + | + | + |
| G | − | − | − | − |

Example 3

Tensile Shear Strength (Wood-to-Wood Bonds) and Viscosity Behavior of Emulsion-Based Adhesives

| Formulation: | |
|---|---|
| Styrene/acrylate dispersion (for example DL 345 from Dow Latex) | 110 g |
| Pigment dispersant (for example Pigmentverteiler A, BASF) | 4 g |

Fillers:

A: fine calcite filler (for example Omyacarb 5GU, D50 value 6 μm; Omya)

B: unground WDP gypsum (for example from Rethmann, D50 value 40 μm)

C: ground natural gypsum (for example Alabaster Brilliantweiß, D50 value 11 μm; Börgardts)

D: coarse calcite filler (for example 50:50 mixture of Omyacarb 130 AL/Omyacarb 40 GU, D50 value (mixture) 88 μm; Omya)

Same-weight Filler Exchange

| Filler Mixture | | | | | Tensile shear strength [N/mm$^2$] | Viscosity [scale units] |
|---|---|---|---|---|---|---|
| A [%] | A [g] | B [g] | C [g] | D [g] | | |
| 0 | 0 | 250 | — | — | 2.1 | 100 |
| 50 | 125 | 125 | — | — | 4.7 | 38 |
| 100 | 250 | 0 | — | — | 2.7 | 210 |
| 0 | 0 | — | 250 | — | 3.7 | 100 |
| 50 | 125 | — | 125 | — | 3.0 | 94 |
| 100 | 250 | — | 0 | — | 2.7 | 210 |
| 0 | 0 | — | — | 250 | 3.1 | 36 |
| 20 | 50 | — | — | 200 | 3.2 | 41 |
| 50 | 125 | — | — | 125 | 3.8 | 39 |
| 80 | 200 | — | — | 50 | 2.9 | 135 |
| 100 | 250 | — | — | 0 | 2.7 | 210 |

Example 4

Tensile Shear Strength (Wood-to-Wood Bonds) and Viscosity Behavior of Emulsion-Based Adhesives Containing WDP Gypsum with Different Particle Size Distributions Formulation:

Styrene/acrylate dispersion (for example DL 345 from Dow Latex) 110 g
Pigment dispersant (for example Pigmentverteiler A, BASF) 4 g Fillers:
A: fine calcite filler (for example Omyacarb 5GU, D50 value 6 μm; Omya)
E: unground WDP gypsum (for example No. 1 from ProMineral, D50 value 36 μm)
F: unground WDP gypsum (for example No. 2 from ProMineral, D50 value 96 μm)
G: medium-coarse calcite filler (for example Omyacarb 40 GU, D50 value 44 μm; Omya)

Same-weight Filler Exchange

| Filler Mixture | | | | | Tensile shear strength [N/mm²] | Viscosity [scale units] |
|---|---|---|---|---|---|---|
| A [%] | A [g] | E [g] | F [g] | G [g] | | |
| 0 | 0 | 250 | — | — | 2.2 | 90 |
| 20 | 50 | 200 | — | — | 2.9 | 37 |
| 50 | 125 | 125 | — | — | 3.5 | 27 |
| 80 | 200 | 50 | — | — | 3.4 | 43 |
| 100 | 250 | 0 | — | — | 2.7 | 210 |
| 205 | 0 | — | 250 | — | 1.1 | 120 |
| 164 | 50 | — | 200 | — | 1.6 | 60 |
| 102 | 125 | — | 125 | — | 2.7 | 19 |
| 41 | 200 | — | 50 | — | 4.3 | 42 |
| 0 | 250 | — | 0 | — | 2.7 | 210 |
| 0 | 0 | — | — | 250 | 3.4 | 38 |
| 20 | 50 | — | — | 200 | 3.5 | 45 |
| 50 | 125 | — | — | 125 | 3.1 | 56 |
| 80 | 200 | — | — | 50 | 2.5 | 80 |
| 100 | 250 | — | — | 0 | 2.7 | 210 |

What is claimed is:

1. A composition comprising:
   (a) at least one water-soluble or water-dispersible polymer; and
   (b) at least one filler comprising WDP gypsum particles obtained from waste-gas desulphurization and having a mean particle diameter ranging from about 13 μm to 500 μm as determined by the Fraunhofer diffraction technique.

2. The composition of claim 1, wherein the mean diameter of the WDP gypsum particles ranges from about 30 μm to 250 μm.

3. The composition of claim 2, wherein the filler further comprises at least one other type of inorganic filler particles in addition to the WDP gypsum particles.

4. The composition of claim 3, wherein the other type of filler comprises chalk, titanium dioxide, barium sulfate, silica flour, silica gel, dolomite, or kaolin or mixtures thereof.

5. The composition of claim 4, wherein the water-soluble or water dispersible polymer is polyurethane, polyacrylate, polymethacrylate, polyvinyl ester, polystyrene, polybutadiene, polyamide, polyester, polyvinyl chloride, ethylene/vinyl acetate copolymer, styrene/butadiene copolymer, styrene/acrylonitrile polymer, styrene/acrylate copolymer or a mixture thereof.

6. The composition of claim 5, wherein the filler is present in the composition in a total amount of at least 40 weight percent, based on the total weight of the composition.

7. The composition of claim 6, wherein the composition comprises from 50 weight percent to 99 weight percent of filler, from 1 weight percent to 50 weight percent of water-soluble or water dispersible polymer, and up to 49 percent by weight of water.

8. The composition of claim 1, wherein the filler includes at least one of chalk, titanium dioxide, barium sulfate, silica flour, silica gel, dolomite, kaolin or mixtures thereof.

9. The composition of claim 1, wherein the water-soluble or water dispersible polymer is polyurethane, polyacrylate, polymethacrylate, polyvinyl ester, polystyrene, polybutadiene, polyamide, polyester, polyvinyl chloride, ethylene/vinyl acetate copolymer, styrene/butadiene copolymer, styrene/acrylonitrile polymer, styrene/acrylate copolymer or mixtures thereof.

10. The composition of claim 1 wherein the composition is a surface coating, a surfacing composition, a sealing composition, an adhesive, or a molding composition.

11. A process for preparing a polymer-containing composition comprising combining in any order one or more water-soluble or water-dispersible polymers with filler particles, wherein the filler particles comprise WDP gypsum particles that are obtained from waste-gas desulphurization and have a mean particle diameter ranging from 13 μm to 500 μm as measured by the Fraunhofer diffraction technique.

12. The process of claim 11 wherein the filler particles comprise a mixture of the WDP gypsum particles and at least one other type of inorganic filler particles.

13. The process of claim 11 wherein the water-soluble polymers or water-dispersible polymers are in an aqueous dispersion prior to the combination with the filler particles.

14. The process of claim 11 wherein the polymer-containing composition is in the form of a solid powder, a paste, an aqueous dispersion, or a non-aqueous liquid.

15. The process of claim 11 wherein water or one or more other additives, or combinations thereof are combined in any order with the polymers and filler particles to form the polymer-containing composition.

16. The process of claim 11 wherein the polymer-containing composition is a polymer dispersion and wherein the filler particles comprise at least one other type of inorganic filler particles and the WDP gypsum particles have a mean particle diameter ranging from about 30 μm to 250 μm.

17. A process for preparing a surface coating, a surfacing compound, a sealing compound, an adhesive, or a molding composition comprising combining one or more water-soluble or water-dispersible polymers with WDP gypsum particles wherein the WDP gypsum particles are obtained from waste-gas desulphurization and have a mean particle diameter ranging from about 13 μm to 500 μm as measured by the Fraunhofer diffraction technique.

18. The process of claim 17 wherein the mean particle diameter of the WDP gypsum particles ranges from about 30 μm to 250 μm.

19. A surface coating, a surfacing compound, a sealing compound, an adhesive, or a molding composition prepared by the process of claim 17.

20. The composition of claim 1 wherein the WDP gypsum particles have a mean particle diameter ranging from about 40 to 120 μm.

21. The composition of claim 1 wherein the WDP gypsum particles have a mean particle diameter ranging from about 80 to 100 μm.

22. A composition consisting essentially of:
(a) at least one water-soluble or water-dispersible polymer that is polyurethane, polyacrylate, polymethacrylate, polyvinyl ester, polystyrene, polybutadiene, polyamide, polyester, polyvinyl chloride, ethylene/vinyl acetate copolymer, styrene/butadiene copolymer, styrene/acrylonitrile polymer, or styrene/acrylate copolymer;
(b) WDP gypsum particles obtained from waste-gas desulphurization and having a mean particle diameter ranging from about 13 μm to 500 μm as determined by the Fraunhofer diffraction technique; and
(c) optionally one or more of water, inorganic fillers, emulsifiers, dispersants, stabilizers, defoamers, antioxidants, photostabilizers, and pigment dispersants.

23. The composition of claim 22, wherein the mean diameter of the WDP gypsum particles ranges from about 30 μm to 250 μm.

24. The composition of claim 23 having at least one inorganic filler.

25. The composition of claim 24, wherein the inorganic filler comprises at least one of chalk, titanium dioxide, barium sulfate, silica flour, silica gel, dolomite, and kaolin.

26. The composition of claim 24, wherein the combined amount of gypsum and inorganic filler is present in the composition in a total amount of at least 40 weight percent, based on the total weight of the composition.

27. The composition of claim 26, wherein the composition comprises from 50 weight percent to 99 weight percent of gypsum and inorganic filler, from 1 weight percent to 50 weight percent of water-soluble or water dispersible polymer, and up to 49 percent by weight of water.

28. The composition of claim 24, wherein the inorganic filler includes at least one of chalk, titanium dioxide, barium sulfate, silica flour, silica gel, dolomite, kaolin or mixtures thereof.

29. The composition of claim 22 wherein the composition is a surface coating, a surfacing composition, a sealing composition, an adhesive, or a molding composition.

* * * * *

UNITED STATES PATENT AND TRADEMARK OFFICE
CERTIFICATE OF CORRECTION

PATENT NO. : 7,071,254 B1
APPLICATION NO. : 09/856236
DATED : July 4, 2006
INVENTOR(S) : Klein et al.

It is certified that error appears in the above-identified patent and that said Letters Patent is hereby corrected as shown below:

Title page
(75) Inventors, delete "Friedheim Koepnick" and insert therefor --Friedhelm Koepnick--.
(73) Assignee, delete "Komanditgesellschaft" and insert therefor --Kommanditgesellschaft--.
(73) Assignee, delete "(Hendel KGAA)" and insert therefor --(Henkel KGaA)--.
(56) References Cited, OTHER PUBLICATIONS, line 15, delete "*Hanbook*" and insert therefor --*Handbook*--.

Signed and Sealed this

Twenty-sixth Day of June, 2007

JON W. DUDAS
*Director of the United States Patent and Trademark Office*